United States Patent [19]

Houtz

[11] Patent Number: 4,465,169
[45] Date of Patent: Aug. 14, 1984

[54] WHEEL BRAKE AND LUBRICATION SYSTEM FOR A VEHICLE

[75] Inventor: Kenneth E. Houtz, Streamwood, Ill.

[73] Assignee: Dresser Industries, Inc., Dallas, Tex.

[21] Appl. No.: 336,003

[22] Filed: Dec. 30, 1981

[51] Int. Cl.³ .............. B60K 41/26; F16D 55/00; F16D 13/74
[52] U.S. Cl. .................. 192/4 A; 192/113 B; 188/264 B; 74/411.5
[58] Field of Search .............. 192/12 C, 4 A, 4 R, 192/113 B, 12 R; 74/411.5; 188/71.6, 72.4, 72.5, 352, 369, 264 F, 264 B

[56] References Cited

U.S. PATENT DOCUMENTS

| | | | |
|---|---|---|---|
| 3,754,625 | 8/1973 | Voth et al. | 192/4 A |
| 3,762,503 | 10/1973 | Wilder et al. | 192/113 B |
| 4,037,694 | 7/1977 | Keese | 192/4 A |
| 4,140,198 | 2/1979 | Chamberlain | 180/75 |
| 4,142,615 | 3/1979 | Sidles, Jr. et al. | 192/4 A |
| 4,317,498 | 3/1982 | Jirousek et al. | 192/4 A X |

Primary Examiner—George H. Krizmanich
Attorney, Agent, or Firm—Barry E. Deutsch

[57] ABSTRACT

A combined lubrication and brake actuating fluid system for a drive axle, separate from the transmission hydraulic system of the vehicle, which utilizes the differential housing as a reservoir and uses the extreme pressure gear lubricant therein as the operating fluid. A pump distributes the gear lubricant through a pressure balanced spool valve, responsive to a brake pedal controlled pilot pressure valve associated with the transmission hydraulic system having output ports to both the lubricating inlet of the axle assembly and also to the brake actuating input port.

17 Claims, 4 Drawing Figures

WHEEL BRAKE AND LUBRICATION SYSTEM FOR A VEHICLE

CROSS REFERENCE TO RELATED APPLICATIONS

This application is related to the following applications owned by the Assignee hereof:

Ser. No. 335,948, filed Dec. 30, 1981, entitled AXLE DRIVE AND BRAKE ASSEMBLY by Kenneth E. Houtz, William J. Pratt, and Robert E. King.

Ser. No. 336,218, filed Dec. 31, 1981, entitled INTERNAL BRAKE by Karl Salna, Donald F. Rudny, and Stanley Urman.

Ser. No. 335,896, filed Dec. 30, 1981, entitled DRIVE AXLE ASSEMBLY by William J. Pratt and Robert E. King.

BACKGROUND OF THE INVENTION

This invention relates to drive axles for large land vehicles, such as wheel loaders, of the type having drive components disposed within hubs at the outer ends of the axle and having fluid pressure actuated brakes which may be located within the hub, but not necessarily, and, more particularly, to a fluid system for providing fluid not only for actuation of the brakes but also for lubricant flow to the operating components of the axle assembly.

Prior art drive axle assemblies are illustrated in Keese U.S. Pat. No. 4,037,694 and Sidles, Jr. et al. U.S. Pat. No. 4,142,615. In each case, the outer end of the axle comprises a cavity containing a planetary gear drive assembly and a fluid actuated brake means for braking the drive shaft or sun gear relative to the spindle. In Chamberlain U.S. Pat. No. 4,140,198, the brake means is not in the planetary drive cavity but in an adjacent cavity. In each case, the brake means is actuated by hydraulic fluid which typically also is associated with the hydraulic system used for controlling the transmission. Lubrication of the drive components and cooling of the brakes are accomplished by maintaining a pool of lubricant in the cavity which in Keese is separated from the hydraulic actuating fluid but which may communicate with the differential housing although it is said that there is no significant flow to the housing while in Chamberlain there is intended communication. In one embodiment of Sidles, Jr. et al., hydraulic fluid is sealed in the cavity to lubricate and cool the brake pack and drive components. In any case, lubrication and cooling are entirely separate from the hydraulic brake actuating system.

SUMMARY OF THE INVENTION

In the present invention, the brake pack and drive components are lubricated and cooled by a nearly continuous flow of lubricant from a combined lubrication and brake actuating fluid system, preferably a separate operating fluid system from the transmission hydraulic system of the vehicle, which utilizes the differential housing as a reservoir and uses the extreme pressure gear lubricant therein as the operating fluid. A pressure balanced spool valve, responsive to a pedal controlled pilot pressure associated with the transmission hydraulic system for actuating the brakes, has output ports to both the lubricating inlet of the axle assembly and also to the brake actuating input port, the lubricant flow being interrupted only momentarily at the beginning of brake actuation. There is little chance of intermixing the hydraulic and lubricating fluids because the interface of the systems is in the pressure balanced valve. Additionally, since the brake actuating fluid is gear lubricant, continuous circulation can be maintained in the brake lines. Also a superior lubricant for the planetary drive is maintained in the wheel hub cavity. And, because the differential housing is the reservoir, the volume of lubricant is considerably larger and therefore provides increased cooling capacity for the brake assemblies at the wheels. Moreover, since the lubricant is pumped from the differential housing, the lubricant in the entire axle assembly is filtered which could significantly extend the life of the axle assembly by removing small pieces of metal and other debris accumulating therein.

DESCRIPTION OF THE DRAWINGS

Other objects and advantages of the invention will become more apparent upon reference to the following detailed description of the preferred embodiment and upon reference to the drawings, in which:

FIG. 3 is an enlarged vertical sectional view of the upper portion of the axle assembly of one wheel of FIG. 1, taken along the line 3—3 thereof, being rotated 90° from FIG. 2, except deleting the operating components, and showing the lubricating oil flow passages in the axle assembly.

DETAILED DESCRIPTION OF THE PREFERRED EMBODIMENT

Figure 1:
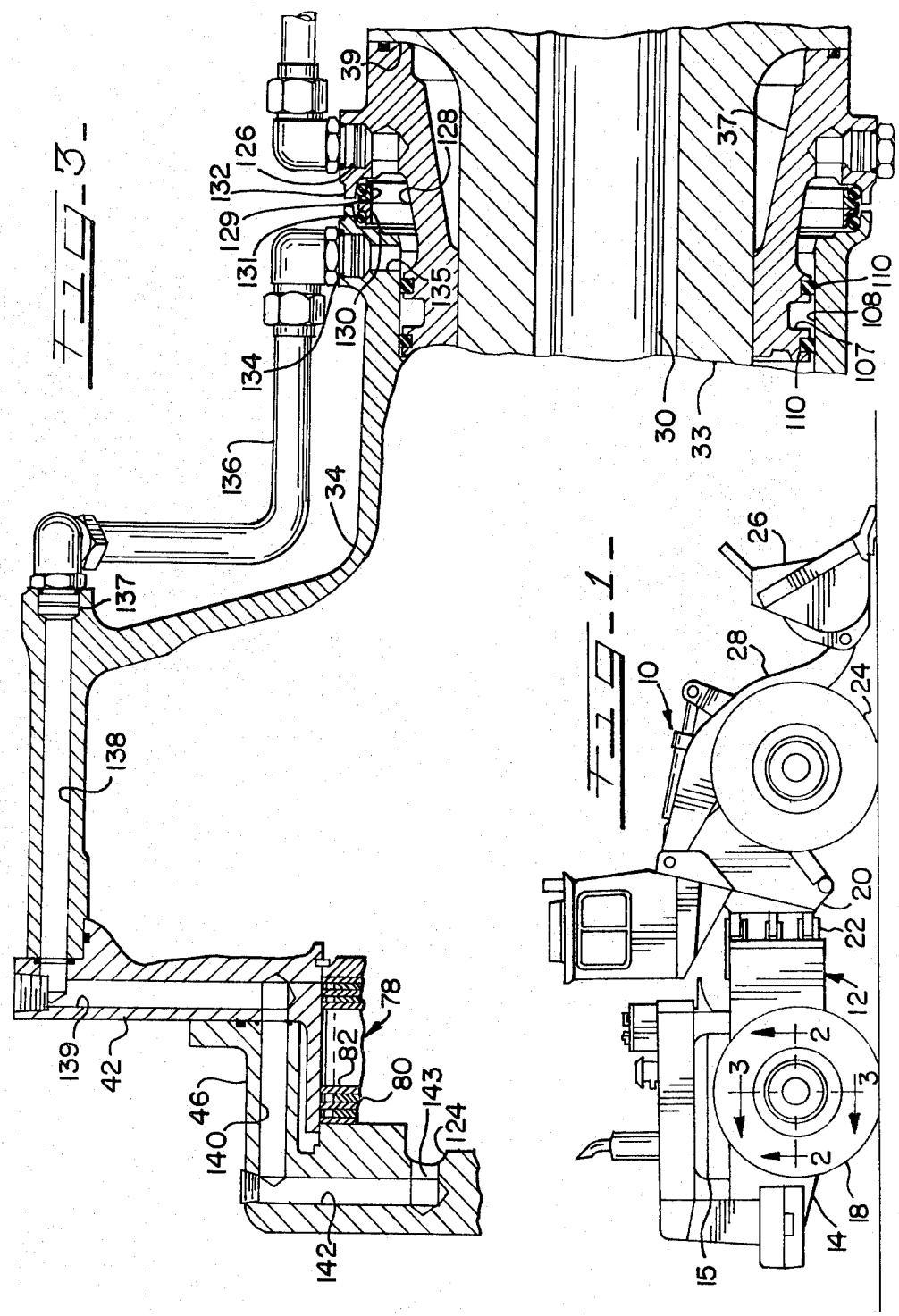
FIG. 1 is an elevational view of a wheel loader vehicle having a drive axle utilizing the improved fluid system in at least one and preferably both of the drive axles of the vehicle.

Referring now to the drawings, there is shown in FIG. 1, a wheel loader 10 having an articulated frame 12, the rear portion 14 of which contains an engine 15 and is supported by rear wheels 18. The front portion 20 of the frame is pivoted at 22 to the rear frame portion 14 and is supported by front wheels 24. A loader bucket 26 is mounted to the end of lift arms 28 supported by the front frame 20.

Figure 2:
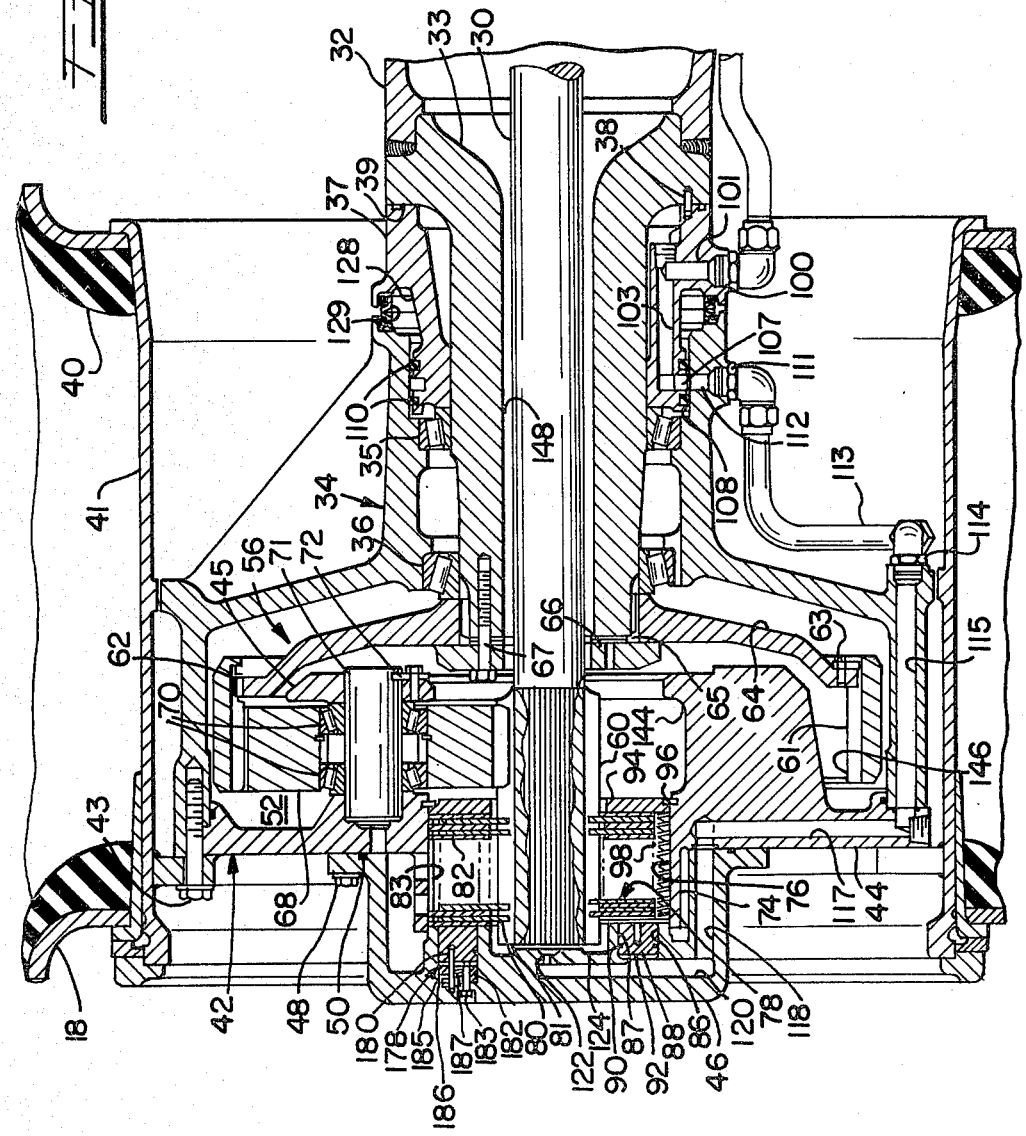
FIG. 2 is an enlarged horizontal sectional view taken through a portion the axle assembly of the vehicle of FIG. 1, along the line 2—2 thereof, and showing the operating components and brake apply fluid passages therein.

The invention is directed to a fluid system for a drive axle and incorporating a planetary gear system that can be used in conjunction with either the front or rear axle illustrated in FIG. 1 and preferably on both. Referring to FIG. 2, a drive axle shaft 30 which is driven from the engine 15 through a transmission and a differential (not illustrated), is supported to rotate within a non-rotating axle and differential housing, portions thereof being shown at 32, trunnion mounted on a longitudinal axis to the frame 12 of the vehicle. An elongated spindle 33 having an axial bore is welded or otherwise nonrotatably secured in outwardly exending relation from the axle housing. A wheel hub assembly 34 is rotatably mounted on the spindle 33 as by inner and outer bearings 35 and 36, the inner bearing 35 abutting a spacer ring 37, fixed against rotation as by pin 38, circumferentially disposed about the spindle and abutting on exterior shoulder 39 thereon. The spacer ring 37 thus locates the bearing 35 without adding a stress concentrating small radius shoulder to the spindle at the bearing mounting. As will be obvious from the drawing, the spacer ring 37 has many other functions which will be described subsequently. The outer diameter of spindle 33 is reduced axially outwardly to permit easy installation of the inner bearing 35 thereon and terminates in a splined end beyond the outer bearing 36.

The tire 40 of the vehicle wheels 18 or 24 is secured in place on a peripheral rim assembly 41 secured to the wheel hub assembly 34 exteriorly of a planet carrier 42, as by a large number of circumferentially spaced bolts 43 extending through both the rim and carrier into taps in the hub assembly, so that both will rotate with the hub assembly relative to the spindle 33 and stationary axle housing 32. The planet carrier 42 is a one piece casting disposed about the drive shaft 30 and has an exterior radial wall 44 and an interior radial wall 45. A cover 46 having a flanged outer perimeter sealed by O ring 50 is secured by a plurality of removable bolts 48 to the exterior radial wall 44 of the planet carrier 42. Thus, the hub assembly 34 has an interior chamber 52 partially enclosed by the planet carrier 42 and the cover 46.

A planetary gear drive assembly 56 is disposed in the hub chamber 52 between the rotating drive shaft 30, the stationary spindle 33 and the planet gear carrier 42 which carries the wheel hub. The planetary gear system includes a sun gear 60 keyed to or formed integrally on the drive shaft 30 at its outboard end and a ring gear 61 keyed against rotation to splines 62 on the peripheral edges of ring gear carrier 64, and secured against axial movement by bolts 63. The inner portion of the carrier 64 is keyed by internal spines 65 to the splined end of the spindle 33. An annular retainer plate 66 attached to the end of the spindle 33 by bolts 67 in axial taps therein retains the ring gear carrier 64 on the spindle 33. The hub of the ring gear carrier 64 further functions as a spacer working against the inner race of the outer wheel hub bearing 36 so that the bearing 35, hub 34, bearing 36, and spacer ring 37 are in continuous abutment to the spindle shoulder 39, shims being disposed between the spindle 33 and the ring gear retainer plate 66 to provide the desired amount of preload on the bearings.

The planetary gear drive assembly 56 further includes a plurality of circumferentially spaced planet gears 68 (only one being shown) engaged with the sun gear 60 and with the ring gear 61, each planet gear being supported rotatably by bearings 70 on a stub shaft 71 secured between the radial walls 44 and 45 of the planet gear carrier 42, being locked therein by a bolted plate 72 received in a corresponding groove in the stub shaft 71. Thus, the rotation of the drive shaft 30 and sun gear 60 causes the planet gears 68 to rotate, and the planet gear carrier 42 to rotate in turn relative to the stationary ring gear 61. The speed reduction ratio can be quite high in such a planetary gear arrangement, on the order of about eight to one for the arrangement shown, so that the wheel hub 34 is rotated at a slower speed, but with higher torque, than the input speed of the drive shaft 30.

The planet gear carrier 42 has an integrally cast annular wall 74 disposed axially and concentrically about the outboard end of the drive shaft 30 and defining a cylindrical cavity 76 opening outboardly or endwardly of the drive shaft. A brake pack 78 is fitted within the cavity 76 and includes two sets of discs 80 and 82 interfitted with one another. Each disc 80, which is provided with friction material on its surfaces disposed to engage the discs 82, has an internal spline that cooperates with the axially extended teeth 81 of the sun gear 60 thereby keying all the discs 80 to the drive shaft 30 while allowing axial movement thereon. The friction material on the disc 80 is grooved in a crosshatch pattern to assist in drawing oil between the discs 80, 82. Each disc 82, which has a metallic surface disposed to engage the discs 80, has an exterior spline that cooperates with a mating internal spine 83 on the annular wall 74 of the planet gear carrier 42 so that all of the discs 82 are keyed to the planet carrier while being movable axially thereon. Since both sets of discs rotate, the materials of the discs 80, 82 could be interchanged with little effect.

A brake actuating means is disposed in the planetary gear cover 46 which has a pair of spaced annular walls 86 and 87 defining a groove opening toward the brake pack cavity 76 which is axially and concentrically disposed relative to the drive shaft 30. An annular piston 88 fits between the annular walls 86 and 87, seals 90 in the piston walls establishing rearwardly of the piston and remotely from the brake pack 78, an annular pressure chamber or cylinder 92 for fluid actuation of the brakes. An annular backing plate 94 is disposed in the brake pack cavity 76 on the inboard end of the brake pack 78 and a split ring 96 fitted within an annular groove in the annular wall 74 of the planet gear assembly 42 holds the backing plate 94 against inboard axial movement. Optionally, the ring 96 and even plate 94 could be integral with the planet carrier 42. A plurality of coiled compression springs, one of which is shown at 98, are located between the outboardmost brake disc 82 and the backing plate 94 for the purpose of providing a mechanical release of the brake pack 78 when the brake cylinder 92 is depressurized. It will be seen that upon pressurizing the annular brake cylinder 92, the annular brake piston 88 is driven axially inboard along the drive shaft and against the brake pack 78 causing the two sets of brakes discs 80 and 82 to frictionally engage each other. Therefore, in the brake-engaged position, the input drive shaft 30 and the sun gear 60 integral therewith is held against rotation relative to the planet gear carrier 42. When any two components of a three component planetary gear system are stopped relative to one another, the entire planetary gear system is stopped and locks up. Accordingly, by braking the relatively rotating members, i.e., the planet carrier and the sun gear, the planet gear carrier becomes locked relative to the ring gear and, accordingly, the wheel hub assembly 34 becomes locked relative to the fixed spindle 33 or the frame 12 of the vehicle.

Automatic adjusting means are also incorporated in the cover assembly to preclude the unlimited release of the brake pack 78 upon its disengagement. This is accommodated by means of a slack adjuster 178 which includes a dowel pin 180 secured to the annular piston 88 and slidingly supported within a plug 182 held by a bolt 183 to the radial wall of the cover 146 and defining a cavity therebetween around the dowel pin 180 which receives a washer 185 positioned with clearance over the dowel pin. A compression spring 187 mounted in the plug 182 engages one edge of the washer 185 and forces it into a canted position so that the inner portion of the washer 185 engages the dowel pin while the outer surface of the washer opposite the compression spring engages a raised corner in the cover 46 as at 186. Upon pressurization of the brake cylinder 92 and the axial displacement of the piston 88, the dowel pin 180 is caused to slide within the washer 185 and possibly shift its position inboardly relative to the washer. Upon depressurization of the cylinder 92, the springs 98 relese the brake and cause the brake piston 88 to be moved axially away from the brake pack 78. The washer 185 strikes the cover corner 186 and cants causing the inner diameter of the washer to engage the dowel pin 180 thus precluding the complete return of the brake piston 88 into the cylinder 92. This automatically compensates for wear of the brake pack discs 80 and 82. Three or more of the slack adjuster assemblies 178 can be equally spaced around the circumference of the cover.

In accordance with the invention, the operating fluid for actuating the brake piston 88 is supplied to the drive axle assembly from a single fluid system providing brake apply pressure, cooling and lubricating fluid, and differential gear lubrication, which will be described in detail hereinafter, to an input port 100 in the spacer ring 37 disposed about the spindle 33 inboard of the wheel hub assembly 34. The port 100 communicates via a radial passage 101 with an axially extending passage 103 in the spacer ring. The outside diameter of the nonrotatable spacer ring 37 reduces in size outboardly to an outboard end telescoping within the wheel hub assembly 34 and thereat is provided with an annular groove 107 defining a cavity between the hub assembly and spacer ring opened to the axial passage 103 and to the annular inner wall 108 of the hub assembly. Square section metal filled ring seals 110 of the type conventionally used in transmissions are located on opposite sides of annular groove 107 to maintain a pressurized fluid seal of the groove 107 while allowing the wheel hub assembly 34 to rotate relative to the spacer ring 37 and spindle 33. On the external side of the wheel hub 34, another port 111 communicates via radial passage 112 with the annular wall 108 of the hub and cavity. The wheel hub port 111 communicates by a pressure tube 113 with a port 114 at the entrance of an axially extending passage 115 in the circumferential wall of the hub assembly 34 which extends into the planet gear carrier 42. The radial wall 44 of the planet gear carrier 42 in turn is provided with a radial passage 117 communicating with the passage 115 and which in turn communicates with an axially extending passage 118 extending therefrom into the cover 46 to a radial passage 120 in the outboard wall thereof. The radial passage 120 opens into the annular brake cylinder 92 formed in the cover 46 and with the base of the brake piston 88. Thus, a passage means is disposed in the hub which establishes fluid communication between the input port 100 on the spacer ring 37 and an outlet into the brake cylinder 92 so that brake apply pressure at the input port 100 will activate the brake pack 78. As is illustrated, the hub assembly 34, planet gear carrier 42 and cover 46 are separate components secured together and, accordingly, at the interfaces in the passages 115, 117, 118, small O-rings are disposed in grooves to preclude leakage pass the abutting components. Additionally, a bleed orifice 122 is disposed in the radial passage 120 of the cover 46 near the center of the axle shaft 30 for the purpose of allowing the brake fluid to continually circulate through the passages and lines described above in order to prevent congealing of the brake fluid under cold operating conditions. The orifice 122 bleeds to a cavity 124 defined within the cover 46 surrounding the outboard end of the drive shaft 30.

Operating fluid for cooling and lubricating the brake pack 78, as well as the various bearings 35, 36 and 70, is also supplied from the same fluid system to an input port 126 (FIG. 3) which is located on the top side of the spacer ring 37, that is, rotated 90° from the brake fluid input port 100 shown in FIG. 2. The input port 126 communicates with a second cavity 128 defined by the outside wall of the spacer ring 37, the hub 34, and a pair of face seals 129, of the conventional type shown, for example, in the aforementioned Sidles patent, each comprising a metal seal ring 130 disposed within a rubber compression ring 131, the radial faces of the rings 130 being disposed in mating relation within the annular outturned edges 132 respectively of the seal ring 37 and wheel hub assembly 34. Thus, a seal is maintained between the hub and spacer ring sealing the exterior of the axle assembly from the interior while permitting relative rotation therebetween. The second cavity 128 is also sealed from the first cavity 107 by the seals 110. The wheel hub 34 is provided with a port 134 communicating via radial passage 135 with the second cavity 128. Thus, a second fluid tight passage is provided between the fixed spacer ring 37 and the rotating hub assembly 34 for the passage of lubricant which also has the benefit of cooling the seals 129. Further, due to its axially adjacent location, leakage from the adjacent high pressure brake apply cavity 107 will leak into the low pressure second cavity rather than exteriorly of the axle. A tube 136 connects the port 134 with a second port 137 opening into an axially extending passage 138 in the circumferential wall of the wheel hub assembly and extending into the planet carrier assembly 42 whereat the passage 138 intersects a radial passage 139 in the wall 44 of the planet carrier 42. The planet carrier passage 139 communicates with an axially extending passage 140 predominately in the cover 46 intersecting a radial passage 142 in the cover which in turn has an unrestricted outlet as at 143 into the cavity 124 adjacent the end of the drive shaft 30. This provides for relatively continuous lubrication and cooling of the gears, bearings and the brake discs.

In the latter regard, the inner portion of the brake discs 80 and 82 are each radially slotted in a conventional manner to allow lubricant flow adjacent the spline 60 on the drive shaft 30 to permit flow to each disc and radially among the discs and filling at least the lower half of the cavity 76. The lubricant flows past the backing plate 94 to an internal cavity 144 formed within the planet gear carrier and lubricates the bearings 70 located between the stub shaft 72 and the planet gear 68. The lubricant further fills the ring gear containing cavity 146 of the wheel hub assembly and lubricates the wheel hub bearings 35 and 36. With all the cavities 76, 144, 146 filled up to the level of the bore of the spindle 33, the lubricant is sent back to the differential housing 32 along the clearance space 148 between the axle shaft 30 and the spindle 33. In this connection it is noted that even though the cavities fill up only half way, since all of the bearings 35, 36, and 70 and the sun and planet gears 60, 68, as well as both sets of brake discs 80 and 82, rotate during operation of the vehicle (except the inner races of bearings 35, 36), more than adequate lubrication and cooling of all of these components is maintained. As previously indicated, the metallic face seals 129 between the hub and spacer ring are also cooled by the lubricant passing through the cavity 128 behind them. Due to its pressurization, the cavity 128 is substantially filled during operation.

Figure 4:
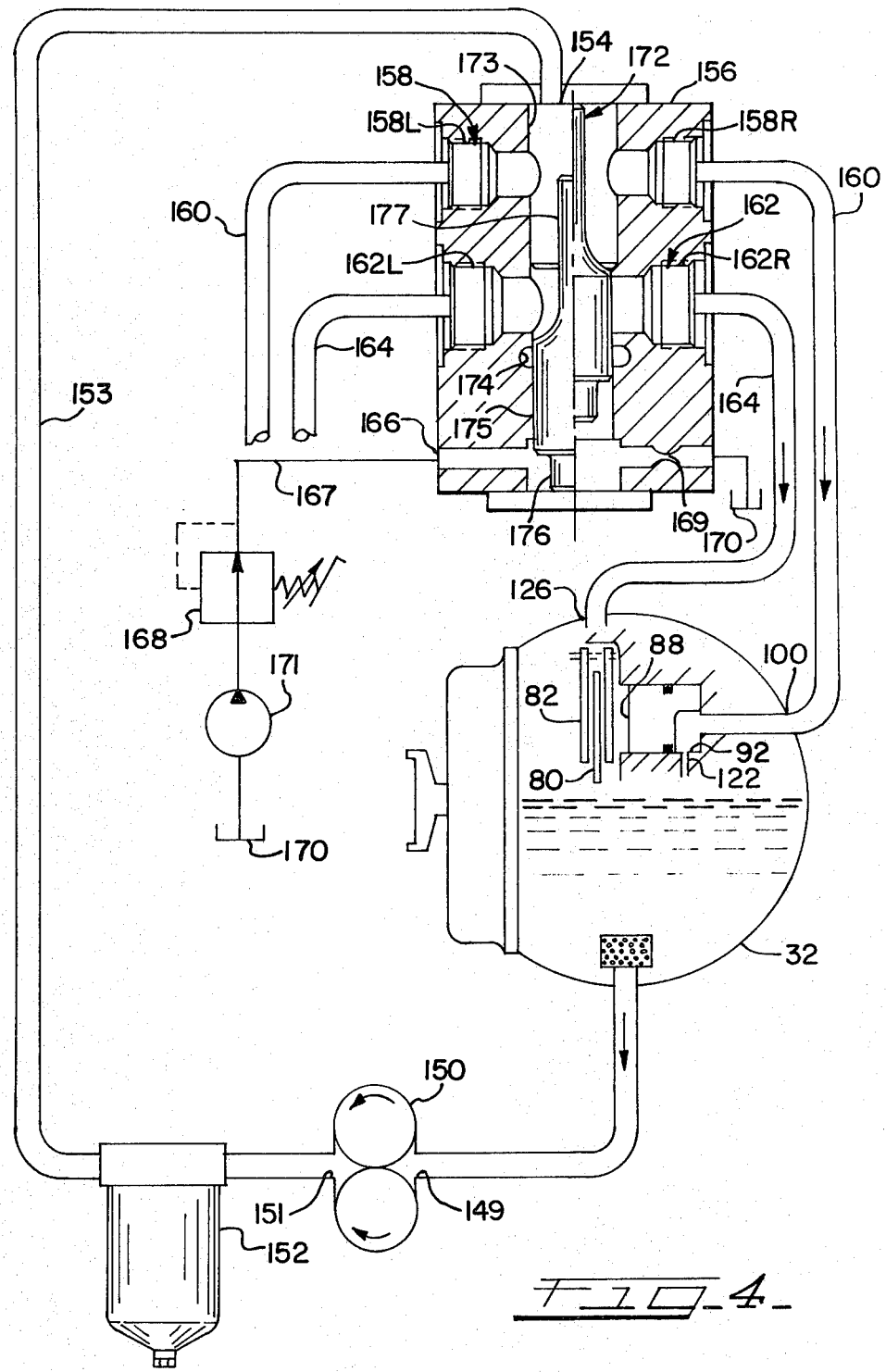
FIG. 4 is a schematic view of the axle fluid system.

Referring now to FIG. 4, there is shown schematically the combined operating fluid system which actuates the brake pack 78, provides the lubrication and cooling for the entire axle drive and brake assembly, and also lubricates the differential gearing (not shown) within the differential housing 32. (The term "operating" is used to distinguish from the vehicle hydraulic control systems and their fluids). Of significant note, is that a single operating fluid, preferably an extreme pressure (EP) gear lubricant of high viscosity such as 85W-140, is used to provide all these functions. Viewed in detail, the operating fluid is supplied to a transmission driven gear pump 150 having a fluid inlet 149 and a fluid outlet 151 from the differential housing 32 of the axle assembly which functions as a reservoir. The operating fluid is pumped through a filter 152 and a pressure line 153 into the input port schematically illustrated at 154 of a brake apply valve 156. The brake apply valve 156 has left and right output ports 158L, 158R respectively, which are connected via tubes 160 to the brake apply input ports 100 at the left and right wheels of the axle respectively. Adjacent the brake output ports 158 are lubricant output ports 162L and 162R which are connected respectively by tubes 164 to the lubrication input port 126 on the spacer ring 37. Further spaced from the brake apply ports 158 is an input port 166 which is connected to a pilot pressure line 167 in turn connected to a pedal actuated brake pilot control valve 168 having a linearly increasing pressure output with pedal stroke located in the operator's compartment of the vehicle. In the brake release position of the pedal, the control valve maintains a small amount of continuous circulation in the pilot control line 168 which flows through an orifice 169 on the right side of the valve 156 back to the transmission hydraulic fluid reservoir 170. It is noted in this regard that the brake pilot control system operates on hydraulic fluid from the transmission hydraulic system pump 171 rather than on the gear lubricant used on the operating fluid side of the brake apply valve 156. A sliding valve spool 172 is disposed in a relatively close fit in spool bore 173, the valve spool 172 being shown at the extreme limits of its travel respectively on the left and right sides of the valve 156 illustrated in FIG. 4. Since the pilot control system operates on transmission hydraulic fluid, an annular groove 174 is disposed in the spool bore 173 between the pilot control input port 166 and the operating fluid lubricating output ports 162. The groove 174 is connected to the operating fluid inlet 154 as by an internal passage in the valve body (not shown) which should be sufficient to provide adequate separation of the fluids since the pressure differential across the spool body is zero because the control pressure and inlet pressure are nearly always equal. The valve spool 172 comprises a cylindrical body portion 175 slidingly fit in the valve bore 173 between the lubricant output ports 162 and the control pressure port 166, a short control side axial stem of smaller diameter than the body 175 extending therefrom to the control side and an elongated operating side axial stem 177 extending from the body portion to the operating fluid side. The relative axial lengths of the body 175, control side stem 176, and operating side stem 177 are configured so that a part of the body portion is always between the ports 162 and 166 and covering the annular groove 174, that when the control side stem 176 contacts the end of the valve 156 on the control pressure side, as shown on the left side of the valve in FIG. 4, both operating fluid output ports 162, 158 are open, and that when the operating side stem 177 contacts the end of the valve 156 on the operating side, as shown on the right side of the valve in FIG. 4, the body portion 175 closes off the lubricant output ports 162 while leaving the brake apply output ports 158 open.

In operation of the operating fluid system, the pump 150 removes gear lubricant operating fluid from the differential housing 32 and pumps it through the filter 152 and into the operating side of the brake apply valve 156 at input port 154. Since the pilot control circuit pressure in the line 168 is maintained at a relatively low level in the absence of a braking signal from the operator, the valve spool 172 moves toward the control side limit of travel, the control side stem 176 preventing the body 175 of the spool 172 from closing off the pilot control pressure input port 166 and the orifice 169 so that control pressure hydraulic fluid is circulated through the control pressure side of the brake apply valve 156 continually. The valve spool acts as a pressure regulator to maintain the operating side at the same pressure as the control side and since there is little restriction in the lubricating fluid passages, the gear lubricant operating fluid will be pumped past the operating side stem 177 of the valve spool 172 through the lubricating output ports 162 and circulated through the line 164 into the lubricating input port 126 on the spacer ring 37 (FIG. 3) and thereafter through the cavity 128 and the above-described hub assembly passages into the cavity 124 adjacent the drive shaft 30 and brake pack 78 at the outboard end of the axle assembly. A small amount of lubricant also flows through the brake apply passages and out the orifice 122 to the cavity 124. When the operator depresses the brake pedal, the pilot control valve 168 increases the pressure in the pilot control line 168, generally proportional to the brake pedal travel. This pressure forces the valve spool 172 momentarily to the operating side limit of travel, as shown in the right side of FIG. 4, so that the spool body 175 closes off the lubricating ports 162 while leaving the brake ports 158 open. Since the brake circuit is restricted, opening only to the brake cylinder 92 and the orifice 122, the pressure on the operating side of the valve spool 172 will quickly build up until it equals the pilot pressure in the line 166, simultaneously pressurizing the brake line 160 and ultimately the brake annular cylinder 92 forcing the brake piston 88 against the brake pack 88. The pressure at the operating fluid inlet 154 will continue to increase until it overcomes the pilot pressure on the pilot side of the valve spool 172 causing the spool to move downwardly and opening the lubricant ports 162 so that the flow from the operating fluid circuit again exits through the lubricating output ports 162, the valve spool 172 reaching an equilibrium position with the ports 162 partially open. Thus, during braking, the flow of lubricant is momentarily cut off but is immediately resumed after the pressure in the operating fluid circuit 153 rises to equalize the pilot pressure in line 168. Then, lubrication is resumed no matter how long braking lasts.

Thus, it will be seen that there has been provided in accordance with the invention, a drive axle fluid system which fully meets the objects, aims and advantages set forth above. Although the invention has been described in conjunction with a preferred embodiment, it should be understood that the invention should not be limited thereto. It is further appreciated that those of ordinary skill in the art in view of the foregoing description will note many other alternatives and modifications which may be made without departing from the true invention. Accordingly, it is intended to embrace all such alternatives and modifications as fall within the scope of the appended claims.

What is claimed is:

1. In a vehicle including a source of power, an axle assembly coupled with ground support means having a lubricating fluid input port, and fluid actuated brake means associated with said axle assembly for effecting braking of said ground support means, said brake means having an actuating fluid input port, a fluid system for providing actuating fluid for said brake means and lubricating fluid for said axle assembly comprising:

an operating fluid reservoir disposed on said vehicle and having an operating fluid contained therein;

an operating fluid pump operatively associated with said source of power and having an inlet in fluid communication with said reservoir and an outlet for supplying an operating fluid from said reservoir through said fluid system;

a spool valve including a valve bore enclosed on both ends and having an operating fluid input port intersecting the valve bore and in fluid communication with said operating fluid pump outlet, said valve having a first operating fluid output port intersecting the valve bore and in fluid communication with said brake means actuating fluid input port and a second operating fluid output port intersecting the valve bore and in fluid communication with said lubricating fluid input port, said valve further having a control fluid input port intersecting said valve bore adjacent the end thereof remote from said input port;

a valve spool comprising a cylindrical body portion slidably disposed in said valve bore between said operating fluid ports and said control fluid input port and dividing said valve bore into an operating fluid side and a control fluid side, an elongated stem portion extending from the operating fluid side of said body portion to a distal end, said distal end providing an operating fluid side stop for said spool, and a second stem portion extending from said body to the control fluid side to a distal end defining a control side stop for said spool, said body and stem portion being so sized relative to the axial location of said output ports that when said spool is at its operating fluid side stop said first brake means actuating output port is open and said second lubricating output port is closed by said spool body portion and when said spool is at its control fluid side stop, both of said operating fluid output ports are open; and a selectively engageable control fluid pressure source associated with said vehicle in fluid communication with said control pressure input port for furnishing a control fluid from said source to said control pressure input port.

2. The invention in accordance with claim 1 and said operating fluid and said control fluid being of different types.

3. The invention in accordance with claim 2 and said valve bore having an annular groove in communication with said operating fluid input port and disposed between said operating fluid ports and said control fluid port to prevent intermixing of said fluids.

4. The invention in accordance with claim 2 or 3 and said operating fluid comprising a gear lubricant oil and said control fluid comprising hydraulic fluid of substantially lower viscosity than said gear lubricant oil.

5. The invention in accordance with claim 1 and said axle assembly including a differential housing comprising said operating fluid reservoir.

6. The invention in accordance with claim 5 and an operating fluid filter being operatively disposed between said differential housing and said spool valve input port.

7. The invention in accordance with claim 5 or claim 6 and said axle assembly including a planetary drive assembly operatively associated with said ground support means disposed at the outer end thereof and said lubricating fluid input port being disposed in communication with lubricating passage means in said axle assembly such that said operating fluid is delivered under pressure to said planetary drive end of said axle assembly and returned internally of said axle assembly to said differential housing.

8. The invention in accordance with claim 7 and said control fluid source operating on a fluid of a type other than that of said operating fluid.

9. The invention in accordance with claim 8 and said brake means being disposed at the planetary drive end of said axle assembly, said brake means input port being disposed in combination with brake passage means in said axle assembly such that said brake fluid is delivered under selective pressure to said brake means.

10. The invention in accordance with claim 9 and a bleed orifice in said brake passage means adjacent said brake means and allowing operating fluid flow from said brake passage means internally of said axle to said differential housing.

11. In a vehicle including a prime power source, a hydraulic control system, a drive axle assembly including a differential housing having axle spindles disposed at its outer ends, wheels mounted on the axle spindles, a drive assembly operably connected between the prime power source and the wheel hubs, and brake means associated with said drive assembly, an operating fluid system separate from but pilot controlled by said hydraulic system for actuating and lubricating said brake system comprising an operating fluid hydraulic pump operably associated with the prime power source and having an input port in fluid communication with said differential housing and an output port, a valve means having an input port in fluid communication with said pump output port, a control input port in fluid communication with said hydraulic system, and an output port in fluid communication with said brake means, the pressure in said output port being responsive to the pressure in said control input port.

12. The invention in accordance with claim 11 said differential housing comprising a reservoir containing gear lubricant.

13. The invention in accordance with claim 11 or claim 12 and lubricant passage means in said axle assembly in fluid communication with said pump output port, said passage means supplying operating fluid under pressure to the hub end of said axle assembly for lubrication of the components thereat.

14. The invention in accordance with claim 13 and said valve means having a second output port in fluid communication with said lubricant passage means.

15. The invention in accordance with claim 14 and said valve means having a spool responsive to said control pressure and configured such that a flow of operating fluid through said second lubricating output port is normally maintained, and upon said control pressure increasing said valve spool temporarily closes said second output port until the pressure in said first brake means output port equals said control pressure.

16. The invention in accordance with claim 15 said valve means including a means to prevent intermixing of said operating fluid and said control fluid.

17. The invention in accordance with claim 12 and an operating fluid filter operatively disposed between said differential housing and said valve means input port.

* * * * *